United States Patent [19]

Schultz

[11] Patent Number: 5,035,185
[45] Date of Patent: Jul. 30, 1991

[54] OUTLET GATE PAN GASKET FOR HOPPER CARS

[75] Inventor: Francis R. Schultz, Woodridge, Ill.

[73] Assignee: Salco Products Inc., Romeoville, Ill.

[21] Appl. No.: 499,709

[22] Filed: Mar. 27, 1990

[51] Int. Cl.[5] ............................................. B65D 53/00
[52] U.S. Cl. .................................. 105/424; 105/247; 222/542; 277/180
[58] Field of Search ...................... 105/247, 282.2, 280, 105/377, 424; 277/206 A, 178, 180, 186; 406/145, 128, 129; 285/368, 910; 222/542

[56] References Cited

U.S. PATENT DOCUMENTS

| | | | |
|---|---|---|---|
| 3,858,752 | 1/1975 | Marvin et al. | 285/910 |
| 3,876,261 | 4/1975 | Jucins et al. | 406/145 |
| 4,272,085 | 6/1981 | Fujikawa | 277/180 |
| 4,768,684 | 9/1988 | Dugge | 406/145 |
| 4,884,723 | 12/1989 | Dugge | 285/910 |

Primary Examiner—Robert J. Oberleitner
Assistant Examiner—Mark T. Ve
Attorney, Agent, or Firm—Kinzer, Plyer, Dorn, McEachran & Jambor

[57] ABSTRACT

An improved outlet gate pan gasket is located between the outlet gate and outlet flange of a hopper car. The gasket includes a central web which fits around the perimeter of the outlet aperture. An inner margin is attached to the inner periphery of the web and an outer margin is attached to the outer periphery. The inner margin has upper and lower horizontal surfaces joined by an edge surface which is perpendicular to the horizontal surfaces prior to compression of the gasket between the gate and outlet flanges. The inner margin has a solid cross-section. The uncompressed thickness of the inner margin is greater than that of either the web or outer margin.

10 Claims, 1 Drawing Sheet

OUTLET GATE PAN GASKET FOR HOPPER CARS

BACKGROUND OF THE INVENTION

This invention relates to outlet gates used on railroad hopper cars and is particularly concerned with a pan gasket for sealing the junction between the bottom wall of a hopper car and an outlet gate. Hopper cars are used to transport granular materials such as grains and plastic pellets. The hopper car body typically has partitions dividing the car into separate compartments. Each compartment has slanted bottom walls extending to and defining an outlet aperture. A separate outlet gate is attached to the underside of the bottom wall. The gate has means for closing off the outlet aperture and selectively openable means for unloading lading, either by gravity or vacuum-assisted methods.

An outlet gate pan gasket is typically located between the outlet gate flange and the flange on the hopper car's bottom wall. The gaskets are intended to assure that no cracks or crevices are present at the outlet gate which might trap granular material. This is important because if material becomes lodged at the outlet gate junction with the bottom wall, there is a potential that the trapped material will subsequently become dislodged and compromise the quality of the next carload.

To prevent this, outlet gate pan gaskets have been used to seal the junction between the hopper bottom wall and outlet gate. All outlet gate pan gaskets are subject to forces of the loaded granular material in the hopper car. Fluent granular material imposes forces similar to the head of a column of liquid. These forces can cause the gasket to deform and permit granules to enter between the gasket and either the outlet gate flange or the mounting flange at the bottom of the car. Such granules can subsequently be dislodged and cause contamination of subsequent loads in the car.

Prior designs of outlet gate pan gaskets have not been entirely successful in achieving the objective of preventing contamination. One such prior art design is shown in cross-section in FIG. 1. The gasket 1 has an internally-facing flange portion 2 that was molded with a hollow chamber 3 throughout its length. This gasket was not sufficiently strong to permit compression of the inner flange 2 in a way to insure consistent loading and consistently maintained loading.

SUMMARY OF THE INVENTION

The present invention provides an outlet gate pan gasket which overcomes the difficulties described above. A primary object of the invention is an outlet gate pan gasket which prevents entrapment of granular material as it exits the hopper car.

Another object of the invention is a gate gasket having a solid cross-section which will keep a constant torque once installed.

A further object of the invention is a gate gasket having an inner margin thicker than the remainder of the gasket to insure proper compression of the inner margin.

Still another object of the invention is a gate gasket having a smaller bolt hole diameter which keeps the gasket's inner edge straight in line with the edge of the car flange. This smaller hole also helps align the gasket more consistently regardless of the torque or bolting sequence the installer utilizes, thus providing a better overall installation.

A still further object is a gate gasket having tighter overall tolerances which will only allow the gasket to be one-eighth inch away from the inside perimeter of the car flange.

These and other objects are achieved by a flexible gate pan gasket which is disposable between the outlet flange and the gate flange of a hopper car. The gasket has a central web which is shaped to generally surround the contour of the car's outlet aperture. An inner margin attached to the inside edge of the web has a solid cross-section. An outer margin is attached to the outside edge of the web. It, too, has a solid cross-section. The uncompressed thickness of the inner margin is greater than that of the outer margin. In the preferred arrangement the uncompressed thickness of the outer margin is greater than that of the web.

DETAILED DESCRIPTION OF THE INVENTION

Figure 1:
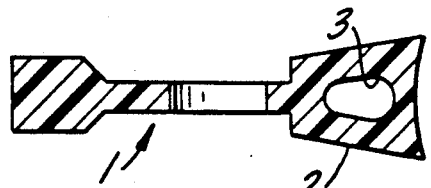
FIG. 1 is a cross-section of a prior art pan gasket.
Figure 2:
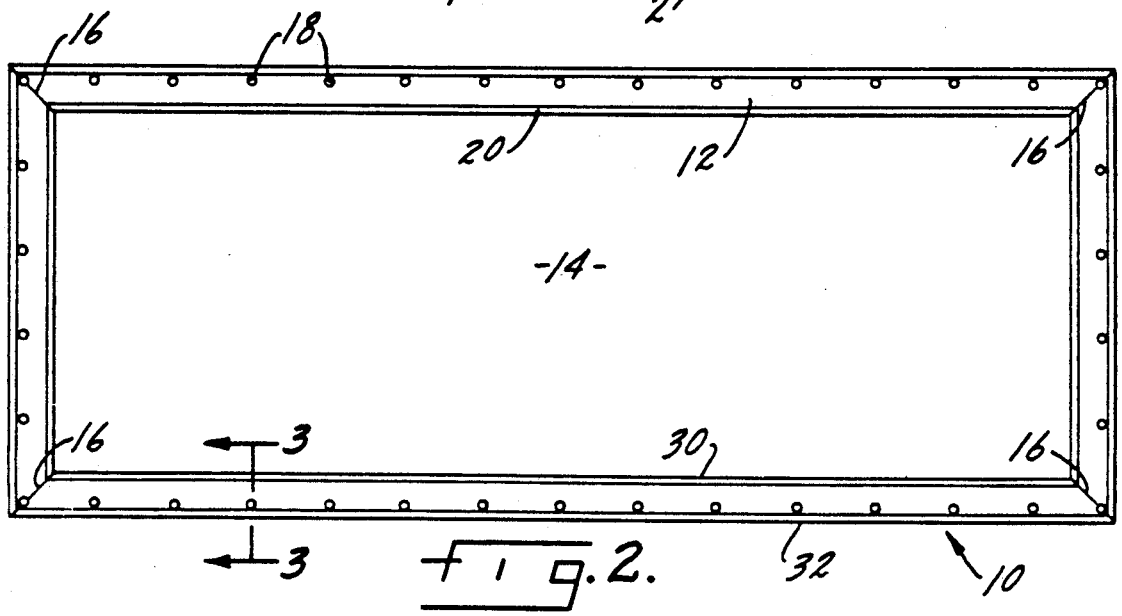
FIG. 2 is a plan view of the outlet gate pan gasket of the present invention.
Figure 3:
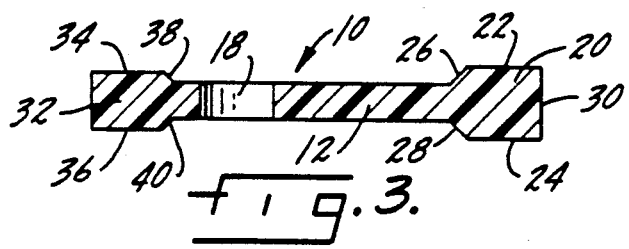
FIG. 3 is a section taken along line 3—3 of FIG. 2.

FIGS. 2 and 3 illustrate the outlet gate pan gasket 10 according to the present invention. Preferably the gasket is made of flexible material such as white vinyl thermoplastic. The gasket 10 has a central web 12 which defines a closed plane figure, in this case a rectangle. The closed plane figure defines an interior opening 14 which coincides with the outlet aperture at the bottom of a car's compartment. Thus, the web 12 is shaped so as to generally surround the contour of the outlet aperture. In the illustrated embodiment the gasket is formed from four pieces cut to the proper lengths. The mitered corners 16 are welded together so that the gasket forms a unitary structure. A plurality of bolt holes 18 are formed in the web and spaced as shown. The hole pattern matches the bolt pattern for the bolts used to attach the outlet gate to the bottom wall of the hopper car.

An inner margin 20 is integrally formed at the interior periphery of the web 12. The inner margin has upper and lower horizontal surfaces 22 and 24, respectively. These surfaces are joined to the web by upper and lower chamfered portions 26 and 28 (FIG. 3). An edge surface 30 extends between the interior limits of the surfaces 22 and 24. As shown in FIG. 3, the edge surface 30 is disposed at right angles to the upper and lower horizontal surfaces prior to installation of the gasket. The inner margin 20 has a solid cross-section, that is, it is not hollow.

An outer margin 32 is integrally formed at the outer periphery of the web 12. Similar to the inner margin 20, the outer margin 32 has upper and lower horizontal surfaces 34 and 36 connected to the web by upper and lower chamfered portions 38 and 40.

Figure 4:
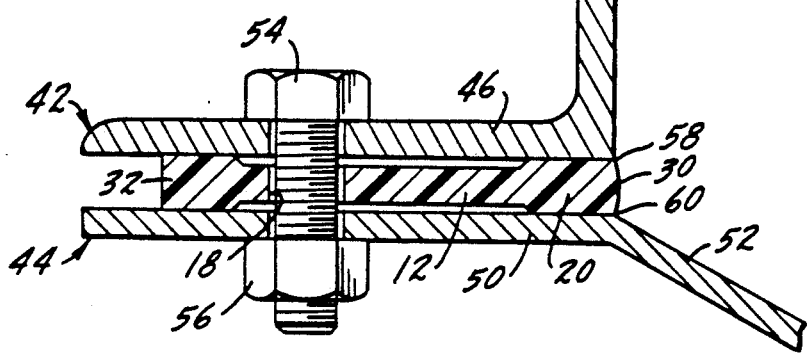
FIG. 4 is a section through a portion of a hopper car outlet, showing the car outlet flange, the outlet gate flange and the pan gasket of the present invention.

It is evident in FIG. 3 that the uncompressed thickness of the inner margin 20 is greater than that of either the outer margin 32 or the web 12. This is important to assure that when the gasket is installed the inner margin will be compressed. This is shown in FIG. 4 where the gasket 10 is installed between the bottom wall of the hopper car, shown generally at 42, and an outlet gate, shown generally at 44. The specific hopper car parts shown are a horizontal outlet flange 46 and an upstanding stiffener plate 48. The plate 48 adjoins the slanted bottom walls of a compartment. Together the outlet flange 46 and plate 48 define an outlet aperture through the bottom wall of the hopper car.

The outlet gate 44 includes a gate flange 50 joined to a chute portion 52. The gate also has a movable cover or vacuum line duct (not shown) for selectively opening and closing the outlet aperture.

The outlet gate 44 is attached to the hopper car 42 by a plurality of bolts 54 and nuts 56. The bolts extend through holes in outlet flange 46 and gate flange 50, as well as the bolt holes 18 in the gasket. The bolts 54 and bolt holes 18 are located such that the gasket's corners (formed by the intersections of the edge surface 30 and horizontal surfaces 22 and 24) are coterminous with the corners 58 and 60 of the outlet and gate flanges. This presents a smooth surface around the periphery of the outlet aperture.

The bolts 56 are torqued to approximately thirty foot pounds. The gate flange 50 compresses the gasket 10 against the outlet flange 46 on the bottom of the car. More specifically, the inner margin 20 is compressed sufficiently to allow the flanges 46 and 50 to contact the upper and lower surfaces of the outer margin 32. Ideally, the outer margin is not compressed. The compression of the inner margin causes the edge surface 30 to bow slightly to the convex configuration illustrated in FIG. 4. Pressure from the material tends only to flatten the bowed edge surface 30; it will not create a concave configuration. This relationship assures that granular material in the area of the outlet aperture does not become lodged between the outlet flange 46 and the gate flange 50. Consequently, the pan gasket provides a contamination-free environment so as to minimize the need for cleaning of one type of granule or color of granule from the car when a new material or color is shipped in the hopper car.

Whereas a preferred form of the invention has been shown and described, it will be realized that modifications could be made thereto without departing from the scope of the following claims.

I claim:

1. In a hopper car of the type having a bottom wall, the bottom wall having at least one outlet flange which defines an outlet aperture in the bottom wall, an outlet gate having a gate flange generally matching the contour of the outlet flange and attached to the underside of the outlet flange, the outlet gate including a moveable cover for selectively opening and closing the outlet aperture, the improvement comprising a flexible gate gasket disposable between the outlet flange and the gate flange, the gasket including a central web which defines a closed plane figure shaped so as to generally surround the contour of the outlet aperture, an inner margin attached to the inner periphery of the web and an outer margin attached to the outer periphery of the web, the inner margin having an uncompressed thickness greater than that of the web and the outer margin, said inner margin having outer surfaces including an upper horizontal surface, a lower horizontal surface and edge surfaces connecting said upper and lower horizontal surfaces, said inner margin being solid throughout a volume bounded by said outer surfaces of said inner margin.

2. The gate gasket of claim 1 wherein the outer margin has an uncompressed thickness greater than that of the web.

3. The gate gasket of claim 2 wherein one of the edge surfaces is vertical prior to compression of the gasket.

4. The gate gasket of claim 3 wherein at least one of the horizontal surfaces is joined to the web by a chamfered portion.

5. The gate gasket of claim 1 wherein the inner margin has upper and lower horizontal surfaces joined by an edge surface which is vertical prior to compression of the gasket.

6. The gate gasket of claim 5 wherein both of the horizontal surfaces are joined to the web by chamfered portions.

7. The gate gasket of claim 6 wherein the outer margin has upper and lower horizontal surfaces joined by an edge surface and wherein the horizontal surfaces of the outer margin are joined to the web by chamfered portions.

8. The gate gasket of claim 1 wherein the outlet gate is attached to the outlet flange by a plurality of bolts and wherein the web includes a plurality of bolt holes sized to snugly receive said bolts so as to substantially fix the position of the gate gasket prior to tightening the bolts.

9. In a hopper car of the type having a bottom wall with at least one outlet gate formed therein, an improved outlet gate construction comprising:

an outlet flange formed in the bottom wall and defining an outlet aperture in said bottom wall;

an outlet gate connected to the outlet flange and having a gate flange generally matching the contour of the outlet flange, the outlet gate including a moveable cover for selectively opening and closing the outlet aperture;

a flexible gate gasket disposed between the outlet flange and the gate flange, the gasket including a central web which defines a closed plane figure generally surrounding the outlet aperture, an inner margin attached to the inner periphery of the web, the inner margin having outer surfaces including upper and lower horizontal surfaces and edge surfaces connecting said upper and lower horizontal surfaces, one of said edge surfaces of the inner margin having a convex configuration when the gasket is installed between the outlet flange and the gate flange; said inner margin being solid throughout a volume bounded by said outer surfaces of said inner margin; an outer margin attached to the outer periphery of the web, the outer margin having an uncompressed thickness, prior to installation, greater than that of the web but less than that of the inner margin; and fastening means for attaching the outlet gate to the underside of the outlet flange.

10. The structure of claim 9 wherein the outlet flange and outlet gate define corners at the outlet aperture and the gate gasket is located such that gasket's corners, defined by intersections of the edge surfaces and the upper and lower horizontal surfaces, are coterminous with the corners of the outlet and gate flanges.

* * * * *